United States Patent
Takeuchi (10) Patent No.: US 6,792,088 B2
(45) Date of Patent: Sep. 14, 2004

(54) TELEPHONE DEVICE CAPABLE OF PREVENTING UNAUTHORIZED TRANSMISSION WHEN SENDING MESSAGES

(75) Inventor: Nozomi Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/318,245

(22) Filed: Dec. 13, 2002

(65) Prior Publication Data

US 2003/0123625 A1 Jul. 3, 2003

(30) Foreign Application Priority Data

Dec. 28, 2001 (JP) ........................................ 2001-399736

(51) Int. Cl.[7] .......................................... H04M 11/00
(52) U.S. Cl. .................... 379/93.03; 455/557
(58) Field of Search ...................... 379/93.03, 93.02, 379/188, 199, 200; 455/410, 411, 557, 565

(56) References Cited

U.S. PATENT DOCUMENTS

| 4,998,291 | A  | * | 3/1991 | Marui et al. ................. 455/563 |
| 6,633,759 | B1 | * | 10/2003 | Kobayashi .................. 455/419 |
| 2002/0068600 | A1 | * | 6/2002 | Chihara et al. ............. 455/550 |
| 2002/0132582 | A1 | * | 9/2002 | Mooney ..................... 455/41 |
| 2003/0013411 | A1 | * | 1/2003 | Uchiyama ................... 455/550 |

* cited by examiner

Primary Examiner—Stella Woo
(74) Attorney, Agent, or Firm—Sughrue Mion, PLLC

(57) ABSTRACT

A cellular phone decides with a transmission category decision portion whether a message is sent from an external device or from the cellular phone. In the case where the message is sent from the external device, a personal identification number comparison portion compares the personal identification number sent from the external device with a predetermined personal identification number. A control portion permits the message to be sent from the external device only when the two personal identification numbers correspond to each other.

35 Claims, 6 Drawing Sheets

TELEPHONE DEVICE CAPABLE OF PREVENTING UNAUTHORIZED TRANSMISSION WHEN SENDING MESSAGES

BACKGROUND OF THE INVENTION

1. Field of the Invention

The present invention relates to a telephone device capable of sending messages by a transmission operation carried out by external device, and a communication unit comprising this kind of telephone device and external device. The present invention further relates to a method of communication where a telephone device sends messages based on transmission operation in the external device.

2. Description of the Related Art

In recent years, a short distance wireless communication technology, called Bluetooth, has been developed and there are a large number of devices that utilize Bluetooth. Bluetooth is a technology where peripherals, such as a cellular phone, a terminal adapter, a personal computer, personal digital assistant (PDA), etc., located within a few meters apart from one another, can be wirelessly connected.

Features of Bluetooth are as follows. First, there is no need for a cable except a cable for a power source. Second, there is no directivity and no problem with the presence of shields. This differs from infrared data association (IrDA) where infrared rays are used, whereas radio waves are used in the Bluetooth. Third, communication within the distance of approximately 10 meters is possible. Fourth, a network can be configured without any electronic information devices represented by a personal computer that were once essential to construct the network. Besides, Bluetooth defines a profile to realize a number of applications. Some of the main applications are dial-up, object-push, headset, file transfer, etc.

The dial-up technology will be focused hereinafter. Until now, it has been necessary to connect a personal computer to a telephone circuit or a cellular phone via a cable in order to utilize the dial-up technology.

When the dial-up technology is applied using a wire-telephone circuit, a personal computer is connected to a modular jack via a cable and a message is sent from the personal computer. In this case, what is important is the location of the telephone circuit. The place where the computer can be installed depends on the location where the modular jacks connectable to any telephone circuit are disposed. That is, any area to which the cable may extend from the modular jacks will be the area where the computer can be installed.

When the dial-up technology is utilized using a wireless telephone such as a cellular phone or a personal handy-phone system (PHS), the computer is generally connected to a wireless telephone device by a modem card, a cable, etc. and a message is transmitted from the computer. In this case, the area where the computer can be installed is confined to the area from which the wireless telephone is available.

When a PHS is used, entering far into a building may sometimes result in unstable communication due to the attenuation of radio waves. In such a case, the PHS must be moved together with the computer to a position where radio waves are stable, e.g., next to a window.

Further, in a small area such as in a train, even if there is an only small enough space to spread the personal computer, the user should have placed a cellular phone within the range to which the cable can extend from the personal computer.

On the contrary, by connecting the personal computer to a cellular phone or a telephone circuit via Bluetooth, the area where the personal computer may be installed can be enlarged. For example, when a terminal adapter with built-in Bluetooth is connected to integrated service digital network (ISDN) circuit and also the personal computer corresponds to Bluetooth, the computer can be installed anywhere within the range to which a Bluetooth connection can be applied.

In the case where a cellular phone having built-in Bluetooth is used, a message can be sent from the computer picked up out of a bag while the cellular phone is put in the bag. Further, when you want to utilize the dial-up at the area where radio waves are weak, you can send a message from the computer placed in another room through the dial-up while a cellular phone or a PHS is positioned next to a window where radio reception is stable enough. When the dial-up is utilized using Bluetooth in such a manner, convenience is greatly enhanced compared to that in using the wire-telephone interface.

The general manner of utilizing the dial-up via Bluetooth will be described in the following according to the examples where used are the personal computer with built-in Bluetooth and a cellular phone with built-in Bluetooth.

The dial-up process using Bluetooth comprises two steps. A first step is connecting the personal computer to the cellular phone via Bluetooth, and a second step is processing the dial-up operation conventionally by the personal computer.

Figure 1:
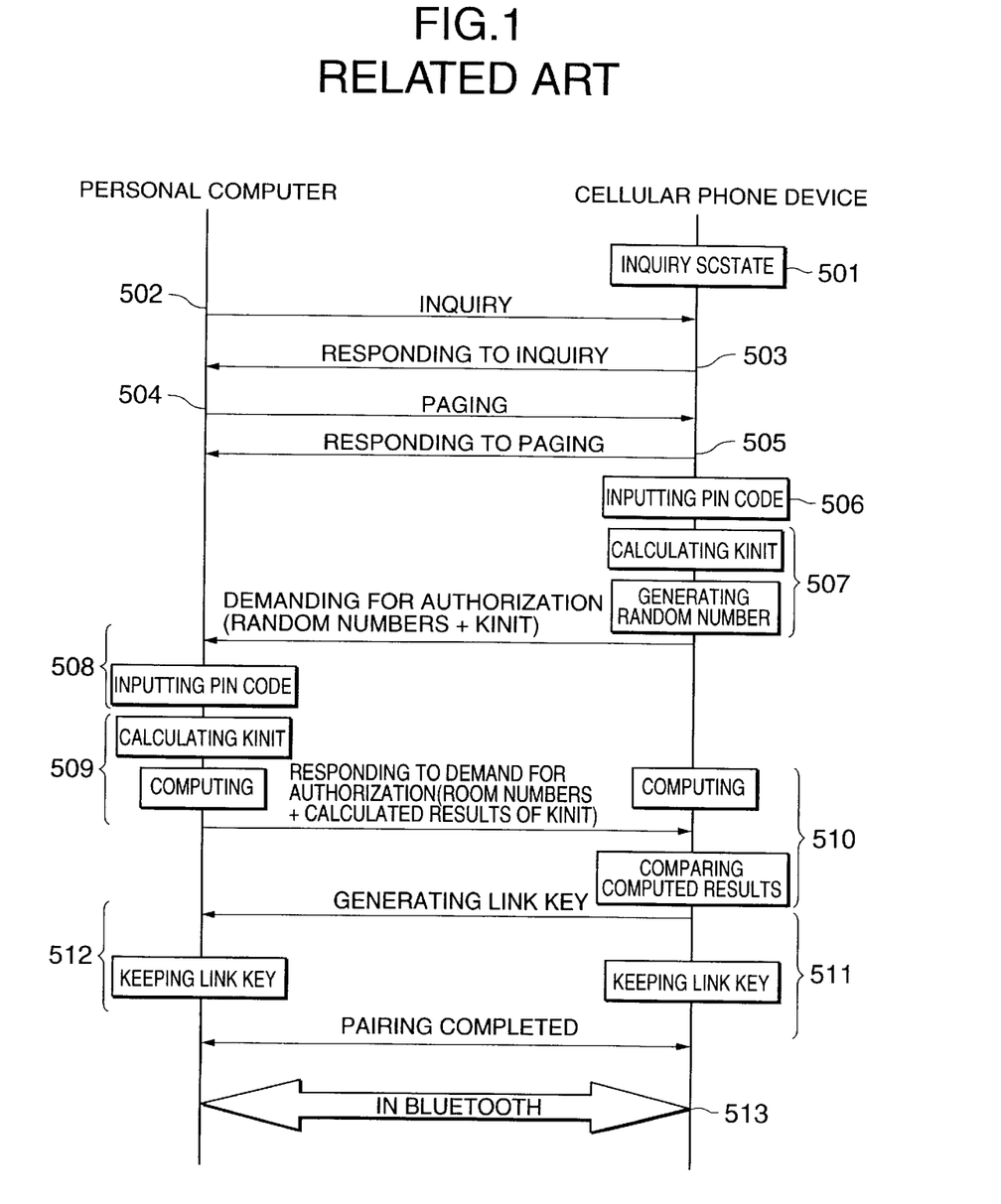
FIG. 1 is a sequence chart showing a general method of a Bluetooth connection between a personal computer as an external device and a cellular phone device.

A general method of connecting the computer to the cellular phone device via the Bluetooth will be described as follows referring to the sequence chart in FIG. 1 in view of security problems.

First, the cellular phone device is set to an Inquiry Scan state (S501). Here, an Inquiry Scan state means a state ready to be inquired by a Bluetooth device, which is inquiring other Bluetooth devices.

Inquiry from the personal computer is processed for a predetermined time (S502). Here, Inquiry means a function through which one Bluetooth device can inquire if another Bluetooth device exists or not. The cellular phone responds to the personal computer when Inquiry from the personal computer is received (S503).

After Inquiry is finished, the operator of the personal computer selects a desired cellular phone device out of the Bluetooth device, which has been inquired and Paging is processed (S504). Here, Paging means a function through which call the particular device desired to be connected. The cellular phone having received Paging from the personal computer responds to the Paging (S505).

After responding the Paging, the cellular phone requires the user thereof to input a PIN code (S506). The PIN code may be a code consisting of a few figures or a row of characters. When the PIN code is inputted, the cellular phone presents KNIT calculated using the PIN code and a random number generated to the personal computer and requires the personal computer to authorize them (S507).

The computer having received the demand for authorization from the cellular phone also requires the user to input his PIN code (S508). At this time, the user must input the same row of characters as the row of the characters of the PIN code having been inputted into the cellular phone.

Once the PIN code is inputted, the personal computer calculates KINIT through the same manner as that of the cellular phone, and further computes using the calculated KNIT and the random numbers received together with the demand for authorization from the cellular phone. The personal computer sends the computed results back to the cellular phone (S509).

The cellular phone computes in the same manner as that of the personal computer using the KNIT, which has been calculated by itself and the random numbers, which has been sent to the personal computer. The cellular phone compares the computed results with the computed results, which have been received from the personal computer (S510).

When both the computed results are equal to each other, the cellular phone calculates a link key and sends the link key to the personal computer and at the same time keeps the link key (S511). The personal computer, which has received the link key, keeps the link key as well (S512).

Thereby, the Bluetooth connection between the personal computer and the cellular phone is completed (S513). The process up to the step of keeping the link key is referred to Pairing and a state keeping the link key is called a State with Bonding.

The above-mentioned procedure is that for a state without bonding between the personal computer and the cellular phone, usually this procedure is that for the case where both of them are connected for the first time.

Figure 2:
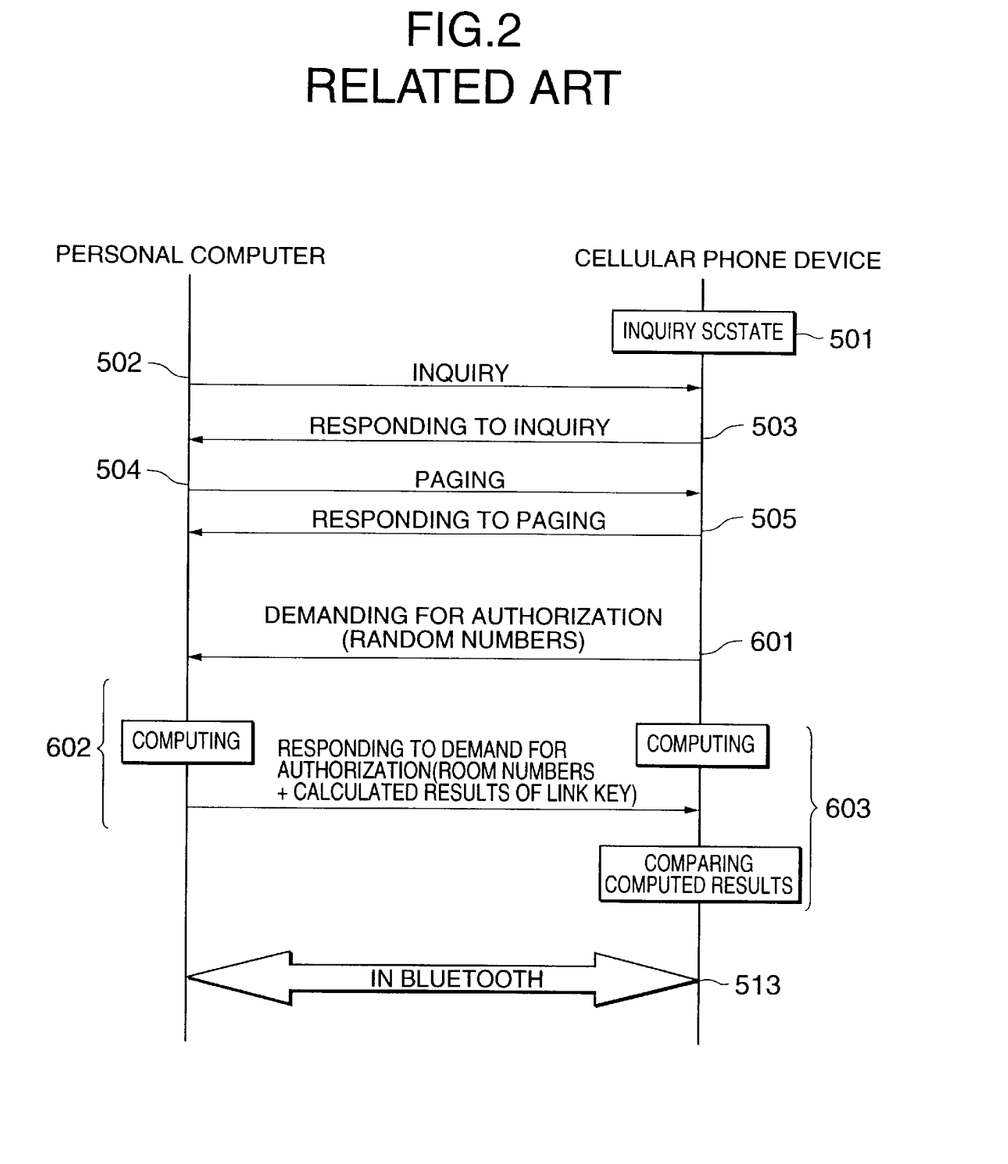
FIG. 2 is a sequence chart showing another general method of the Bluetooth connection between the personal computer as an external device and the cellular phone device.

Next, a procedure for a state with boding between the personal computer and the cellular phone will be described below referring to the sequence chart in FIG. 2.

The cellular phone is set to the Inquiry Scan state (S501). Then, Inquiry from the personal computer is processed for a predetermined time (S502). The cellular phone responds to the personal computer when Inquiry from the personal computer is received (S503).

After Inquiry is finished, the operator of the personal computer selects a desired cellular phone device out of the Bluetooth device, which has been inquired and Paging is processed (S504). When receiving Paging from the personal computer, the cellular phone responds to the Paging (S505). Up to this step the procedure is the same as that for the state without bonding.

Next, the cellular phone presents a random numbers to the personal computer and also demands for authorizing it (S601). The computer having received the demand for authorization from the cellular phone computes using the random numbers presented by the cellular phone and the link key kept therein, and sends the computed results to the cellular phone (S602).

The cellular phone computes in the same manner as that of the personal computer using the link key and the random numbers, which has been presented to the personal computer, and compares the computed results with the computed results, which have been received from the personal computer (S603). When both the computed results are equal to each other, the Bluetooth connection between the personal computer and the cellular phone is completed (S513).

When both of the two are in a state with bonding, the necessary operation for the cellular phone is only setting the cellular phone to the Inquiry Scan state. However, for the cellular phone, which can be set to the Inquiry Scan state at all times, even the operations above are not necessary.

Figure 3:
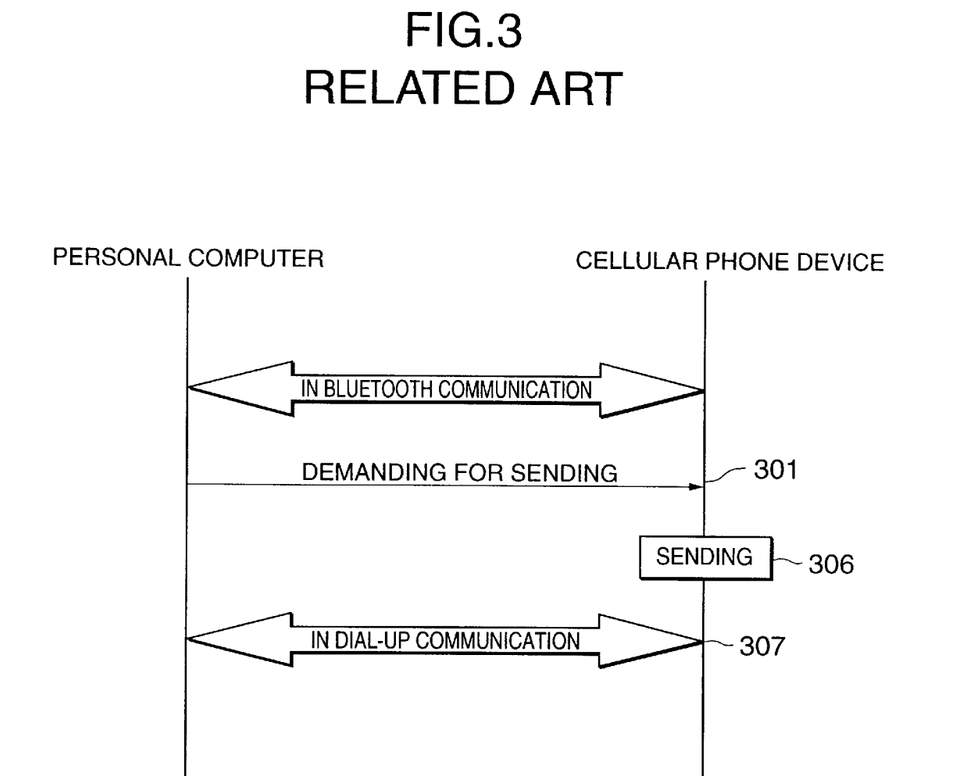
FIG. 3 is a sequence chart of a dial-up operation after the Bluetooth connection is established.

A sequence chart for the operations of the dial-up after the completion of the Bluetooth connection is shown in FIG. 3.

After the Bluetooth connection is completed, the dial-up operation can be processed in the same manner as that in the case where the computer is connected to the cellular phone with a cable. Starting a soft ware for the dial-up, appointing the telephone number of a party to which the dial-up is setting, processing the operation of sending a message (S301), the cellular phone will send the message at once (S306). In this process, no operation will be done for the cellular phone.

The period of keeping the bonding (link key) is different depending upon the type of devices. For example, there are a device where no bonding is done (namely, no keeping the link key), a device where the bonding is kept for a predetermined period (namely, keeping the link key) and a device keeping the bonding for an indefinite period. There are some devices where the mode is already set to one of the above states and also some devices where the user may choose the mode. Generally, the bonding can be eliminated manually.

As mentioned above, once the Bluetooth connection is completed between the personal computer and the cellular phone and the bonding is done, the dial-up can be completed without any operation on the cellular phone.

Usually, the equipment held by the user is connected to the cellular phone of the user himself. Considering this point, it is very convenient that the dial-up can be processed without the input of the PIN code at connection by keeping the bonding for an indefinite period.

No dial-up operation can be done without a user's operation in such cases where no Bluetooth connection has ever been established between a personal computer and a cellular phone, or where a user has set his cellular phone to the mode of no bonding.

However, in the case where a Bluetooth connection between a personal computer and a cellular phone is established by any causes and the personal computer is turned bonded to the cellular phone, transmission can be done without passing through the cellular phone. Therefore, there is possibility of completing a dial-up operation without the awareness of a user.

A function called dial lock for confining transmission is known as one function of a cellular phone. The dial lock function is such a function that the operation except responding to a received message can generally be processed only when a user inputs a predetermined personal identification number into the cellular phone. Once the dial lock function is set, the cellular phone cannot send a message via the transmission operation and any dial-up operation using a Bluetooth cannot be processed. However the dial lock function is very inconvenient for the ordinary transmission of a message, because the dial lock function must be unlocked at each transmission by inputting a personal identification number.

With regard to sending a message by the operation of an ordinary cellular phone, there is no chance that any message can be transmitted without the awareness of the user as far as the cellular phone itself is well managed. However, in regard to the cellular phone having a dial-up function with the Bluetooth, there is possibility of sending a message without the awareness of the user in spite of careful managing the cellular phone itself if only the conditions are satisfied as mentioned above.

Although the explanation has been described until now employing a cellular phone as an example, the problems are not limited to the cellular phone but also common to all kinds of telephone devices regardless of type, wire or wireless.

SUMMARY OF THE INVENTION

The present invention has been accomplished to solve the above-described problems experienced by the related art.

Thus, an aspect of the present invention is to provide a telephone device that sending any messages from an external device is prevented while the user of the cellular phone is not aware of the fact, in a cellular phone device or other telephone devices connected to the external device and capable of sending a message via the external device.

Also, a second aspect of the present invention is to provide a communication unit that sending any messages from an external device is prevented while the user of the cellular phone is not aware of the fact, the unit comprising an external device and a telephone device capable of sending a message via the external device.

Further, a third aspect of the present invention is to provide a control method of communication where sending a message from a telephone device is executed via an external device and sending any messages from an external device is prevented while the user of the cellular phone is not aware of the fact.

To solve the above-mentioned problem, a telephone device of the present invention, which is connected with external device, comprises a judging means for judging whether the external device demands to send a message. The telephone device further comprises a controlling means for controlling the sending of the message if a predetermined condition is satisfied when the external device demands to send the message. The telephone device further comprises a storing means for storing first personal data, a receiving means for receiving second personal data from the external device and a comparing means for comparing the first personal data and the second personal data. The predetermined condition is that the first personal data is equal to the second personal data. The first personal data and the second personal data are personal identification numbers, respectively. The telephone device is connected with the external device via Bluetooth. The telephone device may be a cellular phone.

A communication unit of the present invention comprises external device and a telephone device. The external device comprises an outputting means for outputting demands to send a message. The telephone device comprises a judging means for judging whether the external device demands to send the message, and a controlling means for controlling the sending of the message if a predetermined condition is satisfied when the external device demands to send the message. The telephone device further comprises a storing means for storing first personal data, a receiving means for receiving second personal data from the external device and a comparing means for comparing the first personal data and the second personal data. The predetermined condition is that the first personal data is equal to the second personal data. The first personal data and the second personal data are personal identification numbers respectively. The telephone device is connected with the external device via Bluetooth. The telephone device may be a cellular phone, and the external device may be a computer.

A method of the present invention for controlling to send a message from a telephone device comprises connecting between the telephone device and external device, and receiving a demand for sending the message from the external device. The method further comprises requiring the external device to send first personal data to the telephone device, comparing the first personal data sent from the external device with a predetermined second personal data and sending the message when both the personal data correspond to each other. The method further comprises storing the predetermined second personal data in the telephone device. The method further comprises counting the time since requiring the external device to send first personal data to the telephone device and canceling the sending of the message when a predetermined time has elapsed. The first personal data and the predetermined second personal data are personal identification numbers respectively. The telephone device is connected with the external device via Bluetooth. The telephone device may be a cellular phone and the external device may be a computer.

A telephone device of the present invention that is connected with external device comprises a judging circuit that judges whether the external device demands to send a message. The telephone device further comprises a controller that controls the sending the message if a predetermined condition is satisfied when the external device demands to send the message. The telephone further comprises a memory that stores first personal data, a receiver that receives second personal data from the external device and a comparator that compares the first personal data and the second personal data. The predetermined condition is that the first personal data is equal to the second personal data. The first personal data and the second personal data are personal identification numbers respectively. The telephone device is connected with the external device via Bluetooth. The telephone device may be a cellular phone.

A communication unit of the present invention comprises external device and a telephone device. The external device comprises an output circuit that outputs demands to send a message. The telephone device comprises a judging circuit that judges whether the external device demands the sending of the message and controller that controls the sending of the message if a predetermined condition is satisfied when the external device demands to send the message. The telephone device further comprises a memory that stores first personal data, a receiver that receives second personal data from the external device and a comparator that compares the first personal data and the second personal data. The predetermined condition is that the first personal data is equal to the second personal data. The first personal data and the second personal data are personal identification numbers, respectively. The telephone device is connected with the external device via Bluetooth. The telephone device may be a cellular phone, and the external device may be a computer.

According to the present invention, when a demand for sending a message occurs, a telephone device decides whether the demand occurs from the external device or from the telephone device itself. Only when the demand for sending the message is that from the external device does the telephone device compare the personal identification number sent from the external device with the predetermined personal identification number. When both the personal identification numbers correspond to each other, the message is sent. In this manner, unauthorized transmission from the external device can be prevented.

BRIEF DESCRIPTION OF THE DRAWINGS

These and other aspects, features and advantages of the invention will become more fully apparent from the following detailed description taken in conjunction with accompanying drawings. In the drawings.

DETAILED DESCRIPTION OF THE EMBODIMENT

Hereinafter, each embodiment of the present invention will be described in detail with reference to the drawings. The communication unit relating to the embodiment comprises a cellular phone (Refer to FIG. 4) and a personal computer (not shown) as an external device, which is to be connected to the cellular phone via a Bluetooth.

Figure 4:
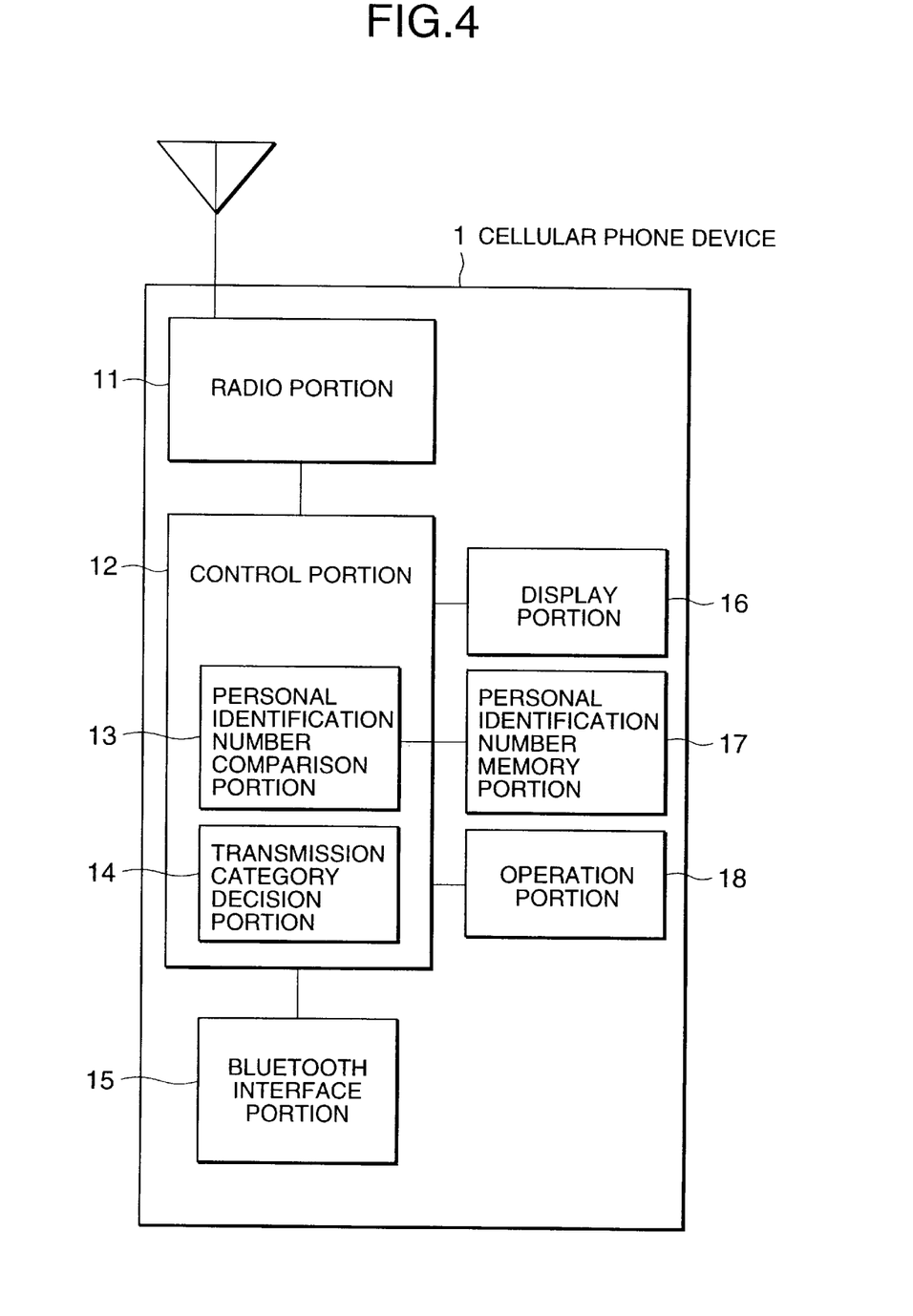
FIG. 4 is a block diagram showing the structure of a cellular phone device, which composes a communication unit pertaining to an embodiment of the present invention.

FIG. 4 is a block diagram showing the structure of a cellular phone device, which composes a communication unit, pertaining to the present embodiment of the present invention.

As shown in FIG. 4, the cellular phone device 1 comprises a radio portion 11, a control portion 12, a Bluetooth interface portion 15, a display portion 16, a personal identification number memory portion 17 and an operation portion 18. The control portion 12 is composed of a personal identification number comparison portion 13 and a transmission category decision portion 14.

The radio portion 11 receives wireless signals from another communication equipment and provides the necessary signal processing, i.e., demodulation, and also modulates the wireless signals transmitted from the cellular phone device 1.

The control portion 12 controls the whole cellular phone device 1. The operation portion 18 comprises several kinds of keys of numerals, characters, etc., which are used when the user of the cellular phone device inputs orders or data in to the cellular phone device 1.

The display portion 16 comprising a liquid crystal display device displays the orders or data inputted by the user via the operation portion 18, signals received from another communication equipment, the present states (a selected mode, remaining capacity of the battery, etc.) of the cellular phone device 1.

The personal identification number memory portion 17 stores a personal identification number to be compared with one, which the personal computer will send. The personal identification number can be set beforehand through operating the operation portion 18 by the user of the cellular phone device 1.

The Bluetooth interface portion 15 executes Bluetooth communication with the personal computer in control of the control portion 12. Namely, the present cellular phone device 1 can communicate with the personal computer as the external device via the Bluetooth interface portion 15, and can also send a message through a dial-up operation in the personal computer.

The transmission category decision portion 14 decides, when sending a message is demanded, whether the demand has been inputted from the operation portion 18 or from the personal computer via the Bluetooth interface 15, and then outputs the decision to the control portion 12.

The personal identification number comparison portion 13 compares the personal identification number stored in the personal identification number memory portion 17 with the personal identification number inputted via the Bluetooth interface portion 15 from the personal computer, and outputs the results of comparison to the control portion 12. Further, when any personal identification numbers are not inputted from the Bluetooth interface portion 15 in a definite period, the personal identification number comparison portion 13 outputs a time-out signal to the control portion.

Figure 5:
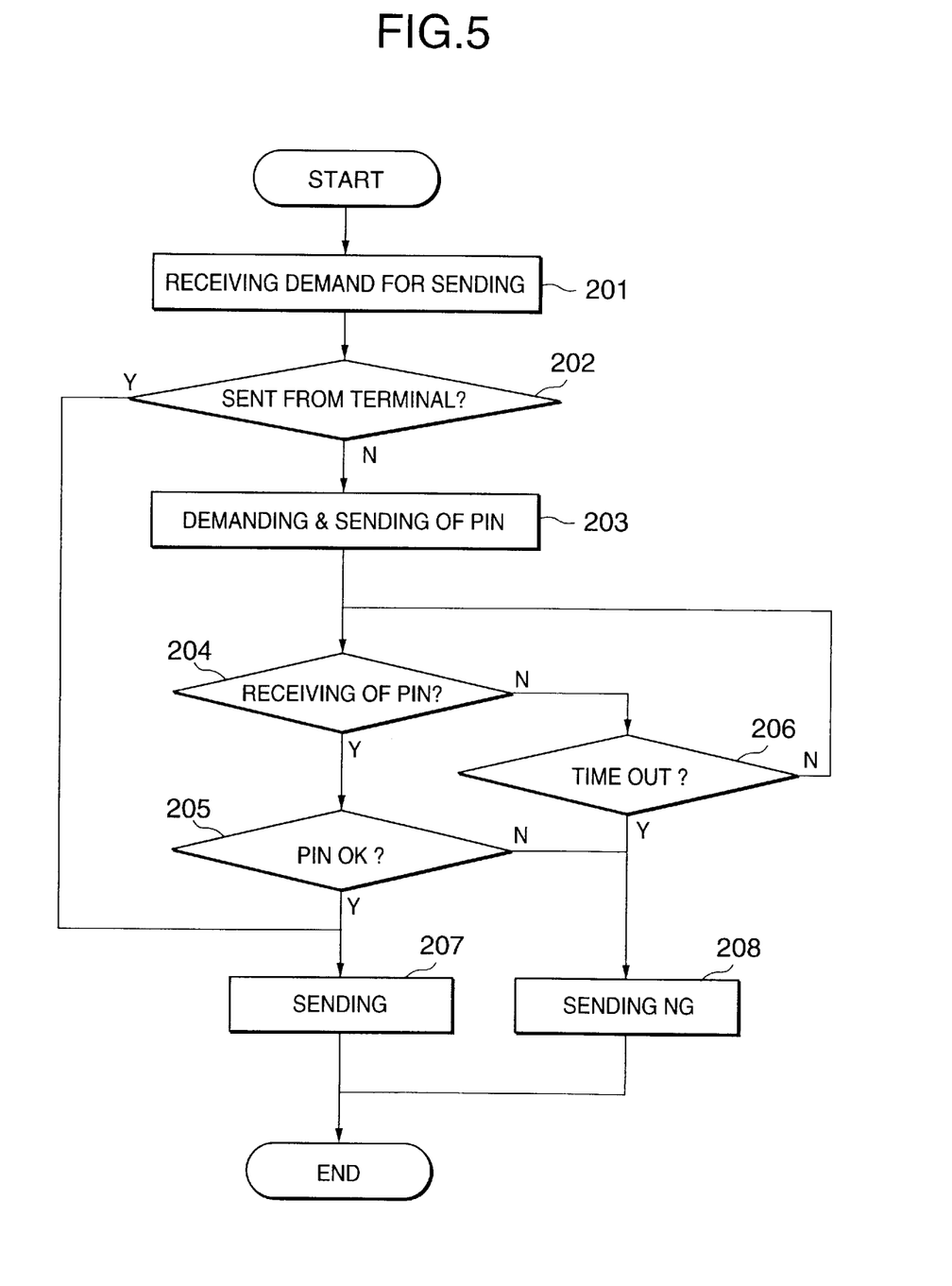
FIG. 5 is a flow chart showing the operation of the cellular phone device shown in FIG. 4.
Figure 6:
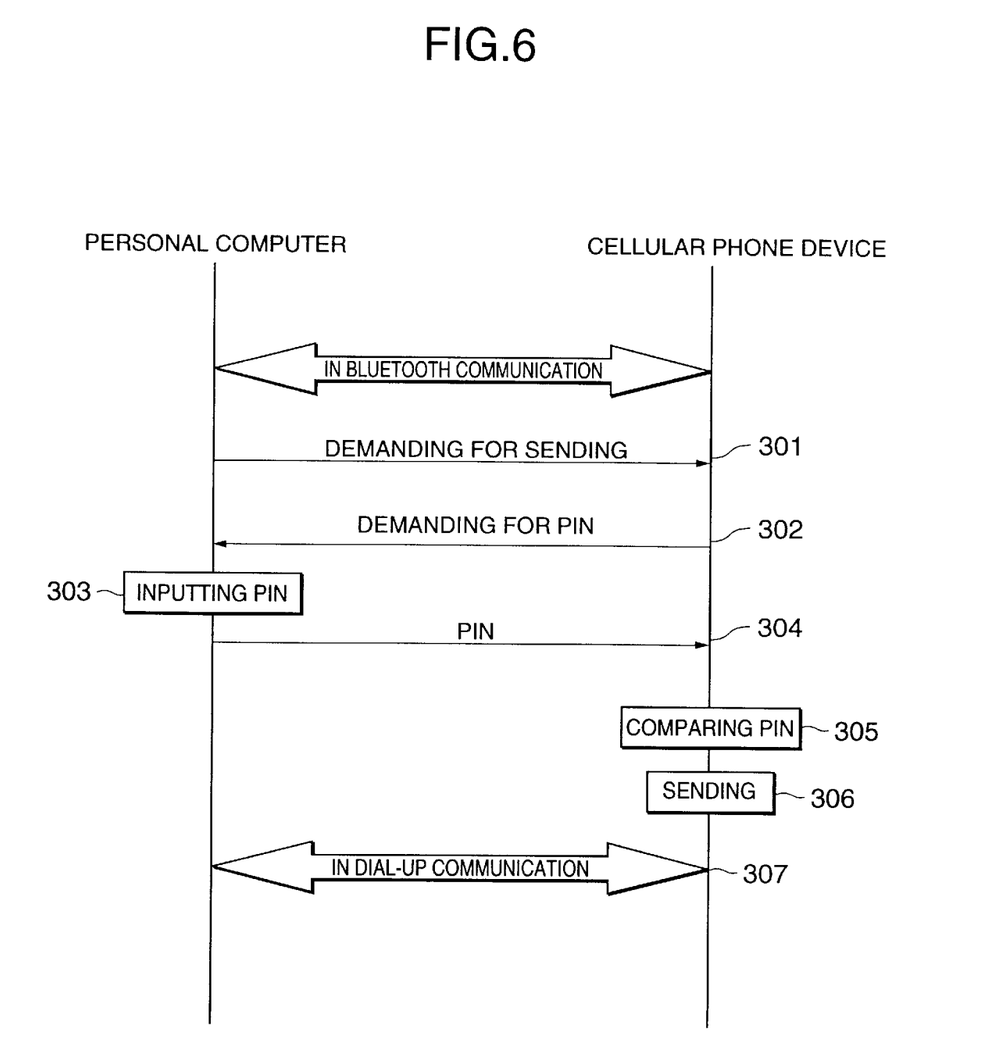
FIG. 6 is a sequence chart showing the situation of communication between the cellular phone device shown in FIG. 4 and a personal computer (i.e., external device).

FIG. 5 is a flow chart showing the operation of a cellular phone device 1. FIG. 6 is a sequence chart showing the situation of communication between the cellular phone device 1 and a personal computer. In the following, the operation of the cellular phone device 1 will be described referring to FIG. 5 and FIG. 6. And it is still assumed that Bluetooth communication is already established between the cellular phone device 1 and the personal computer using a similar manner as that in the conventional art.

When a dial-up operation is processed in the personal computer under the state where the Bluetooth communication is established between the personal computer and the cellular phone device 1, a demand for sending a message is supplied from the personal computer to a control portion 12 via a Bluetooth interface 15 (S201 in FIG. 5, S301 in FIG. 6).

The control portion 12, having received the demand of sending the message, directs a transmission category decision portion 14 to decide whether the demand is from the personal computer via the Bluetooth interface 15 or from an operation portion 18 of the cellular phone.

The transmission category decision portion 14 decides whether the demand is from the personal computer via the Bluetooth interface 15 or from an operation portion 18 of the cellular phone, and informs the results of the decision to the control portion 12 (S202 in FIG. 5).

When the results of the decision indicate that the transmission of the message is from the operation portion 18 (YES at S202 in FIG. 5), the control portion 12 send the message as demanded (S207 in FIG. 5, S306 in FIG. 6). When the results of the decision indicate that the transmission of the message is from the Bluetooth interface portion 15 (NO at S202 in FIG. 5), the control portion 12 directs a personal identification number comparison portion 13 to compare the personal identification numbers with each other.

The personal identification number comparison portion 13 sends a demand for personal identification number to the personal computer via Bluetooth interface 15 (S203 in FIG. 5, S302 in FIG. 6).

When the personal computer receives the demand for the personal identification number from the cellular phone device 1 and shows the fact to the user, the user then inputs the personal identification number into the personal computer (S303 in FIG. 6). After that, the personal computer sends the inputted personal identification number into the cellular phone device 1 (S304 in FIG. 6).

Then, the control portion 12 decides if the Bluetooth interface 15 has received the personal identification number from the personal computer or not (S204 in FIG. 5). In the case where the Bluetooth interface 15 has received the personal identification number from the personal computer (YES at S204 in FIG. 5, S304 in FIG. 6), the personal identification number is supplied to the personal identification number comparison portion 13 via the control portion 12.

The personal identification number comparison portion 13, having received the personal identification number, reads the personal identification number of the cellular phone device 1 from a personal identification number memory portion 17. The personal identification number comparison portion 13 compares both with each other and outputs the results to the control portion 12 (S205 in FIG. 5, S305 in FIG. 6).

When the output from the personal identification number comparison portion 13 indicates "the agreement of both the personal identification numbers" (YES at S205 in FIG. 5), the control portion 12 sends the message as demanded (S207 in FIG. 5, S306 in FIG. 6).

Differing from the above, when the output from the personal identification number comparison portion 13 indicates "the disagreement of both the personal identification numbers" (NO at S205 in FIG. 5), the control portion 12 does not permit to send the message (S208 in FIG. 5).

In the case where the Bluetooth interface 15 has not received the personal identification number from the personal computer (NO at S204 in FIG. 5), the control portion 12 decides if a predetermined period (e.g., for 3 minutes) has passed or not since the demand for personal identification number was sent to the personal computer (S206 in FIG. 5).

In the case where the predetermined period has not yet passed (NO at S206 in FIG. 5), repeated is the decision if the personal identification number (S204 in FIG. 5) has been received from the personal computer or not, until the predetermined period passes over.

In the case where the predetermined period has passed (YES at S206 in FIG. 5), the output from the personal identification number comparison portion 13 turns to show "personal identification number receiving time-out". This means that the personal identification number did not arrive within the predetermined period, and in this case, the control portion 12 does not allow the message to be sent (S208 in FIG. 5).

According to the communication unit relating to the present embodiment having the cellular phone, which operates as described above, the following effects can be obtained.

First, by comparing the personal identification numbers, an unauthorized transmission of a message can be prevented. The reason is because the personal identification number can be compared when sending the message by the personal identification number comparison portion 13 and the personal identification number memory portion 17.

Second, the personal identification number can be compared only when message transmission is demanded from the personal computer, which is acting as the external device. The transmission category decision portion 14 determines whether the demand to send a message has been sent from the external device or sent via the operation portion 18.

In the above embodiment, the Bluetooth was used as the external device of the cellular phone. However, other external devices other than a Bluetooth equipped cellular phone can be used. For example, the same effect can be obtained using an infrared data association (IrDA) relating to infrared rays.

Further, in the above embodiment, although the cellular phone was selected as the telephone device comprising the communication unit, other telephone devices can be used. For example, a wire telephone or a terminal adapter connected to a wire telephone circuit or similar equipment can also be employed.

Again, in the above embodiment, although the personal computer was selected as the equipment to be connected to the external interface of the cellular phone device 1, other equipment can be connected with the cellular phone 1. For example, a portable information terminal, or a personal digital assistant (PDA) can be connected therewith.

Obviously, numerous additional modifications and variations of the present invention are possible in light of the above teachings. It is, therefore, to be understood that within the scope of the appended claims, the invention may be practiced otherwise than as specifically described herein.

What is claimed is:

1. A telephone device that is connected to external device, said telephone device comprising:
    storing means for storing a first personal data;
    judging means for judging whether said external device demands to send a message;
    requesting means for requesting a second personal data from said external device after said demand from said external device;
    receiving means for receiving said second personal data from said external device; and
    controlling means for controlling the demand to send said message if a predetermined condition is satisfied when said external device demands to send said message.

2. The telephone device as claimed in claim 1, further comprising: comparing means for comparing said first personal data and said second personal data for said controlling means.

3. The telephone device as claimed in claim 2, wherein said predetermined condition is that said first personal data is equal to said second personal data.

4. The telephone device as claimed in claim 3, wherein said first personal data and said second personal data are personal identification numbers, respectively.

5. The telephone device as claimed in claim 4, wherein said telephone device is connected with said external device via a predetermined wireless protocol.

6. The telephone device as claimed in claim 5, wherein said predetermined wireless protocol is Bluetooth.

7. The telephone device as claimed in claim 5, wherein said telephone device is a cellular phone.

8. A communication unit, comprising:
    an external device comprising outputting means for outputting demands to send a message; and
    a telephone device comprising storing means for storing a first personal data;
    judging means for judging whether said external device demands to send said message;
    requesting means for requesting a second personal data from said external device after said demand from said external device;
    receiving means for receiving said second personal data from said external device; and
    controlling means for controlling the sending of said message if a predetermined condition is satisfied when said external device demands to send said message.

9. The communication unit as claimed in claim 8, wherein said telephone device further comprises:
    comparing means for comparing said first personal data and said second personal data for said controlling means.

10. The communication unit as claimed in claim 9, wherein said predetermined condition is that said first personal data is equal to said second personal data.

11. The communication unit as claimed in claim 10, wherein said first personal data and said second personal data are personal identification numbers, respectively.

12. The communication unit as claimed in claim 11, wherein said telephone device is connected with said external device via a predetermined wireless protocol.

13. The communication unit as claimed in claim 12, wherein said predetermined wireless protocol is Bluetooth.

14. The communication unit as claimed in claim 13, wherein said telephone device is a cellular phone, and said external device is a computer.

15. A method for controlling the sending of a message from a telephone device, said method comprises:
   connecting between said telephone device and an external device;
   receiving a demand for sending said message from said external device;
   requesting the external device to send a first personal data to said telephone device;
   comparing said first personal data sent from said external device with a predetermined second personal data; and
   sending said message when said first personal data and said predetermined second personal data correspond to each other.

16. The method as claimed in claim 15, wherein said method further comprises storing said predetermined second personal data in said telephone device.

17. The method as claimed in claim 16, wherein said method further comprises:
   counting time since requiring said external device to send said first personal data to said telephone device; and
   canceling transmission of said message when a predetermined time has elapsed.

18. The method as claimed in claim 17, wherein said first personal data and said predetermined second personal data are personal identification numbers, respectively.

19. The method as claimed in claim 18, wherein said telephone device is connected with said external device via a predetermined wireless protocol.

20. The method as claimed in claim 19, wherein said predetermined wireless protocol is Bluetooth.

21. The method as claimed in claim 19, wherein said telephone device is a cellular phone and said external device is a computer.

22. A telephone device which is connected with an external device, said telephone device comprising:
   a memory that stores first personal data;
   judging circuit that judges whether said external device is demanding to send a message;
   requesting circuit for requesting a second personal data from said external device after said demand from said external device;
   receiver that receives said second personal data from said external device; and
   controller that controls the sending of said message if a predetermined condition is satisfied when said external device demands to send said message.

23. The telephone device as claimed in claim 22, further comprising:
   comparator that compares said first personal data and said second personal data for said controller.

24. The telephone device as claimed in claim 23, wherein said predetermined condition is that said first personal data is equal to said second personal data.

25. The telephone device as claimed in claim 24, wherein said first personal data and said second personal data are personal identification numbers respectively.

26. The telephone device as claimed in claim 25, wherein said telephone device is connected with said external device via a predetermined wireless protocol.

27. The telephone device as claimed in claim 26, wherein said predetermined wireless protocol is Bluetooth.

28. The telephone as claimed in claim 26, wherein said telephone device is a cellular phone.

29. A communication unit, comprising:
   an external device comprising an output circuit that outputs demands to send a message; and
   a telephone device comprising:
   a memory that stores a first personal data;
   a judging circuit that judges whether said external device is demanding to send said message;
   a requesting circuit for requesting a second personal data from said external device after said demand from said external device;
   a receiver that receives said second personal data from said external device; and
   a controller that controls the sending of said message if a predetermined condition is satisfied when said external device demands to send said message.

30. The communication unit as claimed in claim 29, wherein said telephone device further comprises:
   a comparator that compares said first personal data and said second personal data for said controller.

31. The communication unit as claimed in claim 30, wherein said predetermined condition is that said first personal data is equal to said second personal data.

32. The communication unit as claimed in claim 31, wherein said first personal data and said second personal data are personal identification numbers, respectively.

33. The communication unit as claimed in claim 31, wherein said telephone device is connected with said external device via a predetermined wireless protocol.

34. The telephone device as claimed in claim 33, wherein said predetermined wireless protocol is Bluetooth.

35. The communication unit as claimed in claim 33, wherein said telephone device is a cellular phone, and said external device is a computer.

* * * * *